(12) United States Patent
Hahn et al.

(10) Patent No.: US 8,185,857 B2
(45) Date of Patent: May 22, 2012

(54) SIGNAL CONVERSION FACILITY AND METHOD FOR CREATING PROGRAMMING FOR A SIGNAL CONVERSION FACILITY

(75) Inventors: Ulrich Hahn, Neustadt/A. (DE); Jürgen Lange, Amberg (DE); Rolf-Dieter Pavlik, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 615 days.

(21) Appl. No.: 12/310,147

(22) PCT Filed: Aug. 8, 2007

(86) PCT No.: PCT/EP2007/058223
§ 371 (c)(1),
(2), (4) Date: Feb. 12, 2009

(87) PCT Pub. No.: WO2008/019976
PCT Pub. Date: Feb. 21, 2008

(65) Prior Publication Data
US 2011/0161906 A1 Jun. 30, 2011

(30) Foreign Application Priority Data
Aug. 14, 2006 (DE) .......... 10 2006 037 975

(51) Int. Cl.
*G06F 17/50* (2006.01)
*H02P 5/74* (2006.01)

(52) U.S. Cl. .......... 716/117; 318/5

(58) Field of Classification Search .......... 716/117; 318/5
See application file for complete search history.

(56) References Cited

U.S. PATENT DOCUMENTS

| 4,912,384 A | 3/1990 | Kinoshita et al. |
| 5,168,441 A | 12/1992 | Onarheim et al. |
| 5,587,640 A | 12/1996 | Ek et al. |

FOREIGN PATENT DOCUMENTS

| DE | 199 08 230 A1 | 8/2000 |
| DE | 103 44 070 A1 | 5/2004 |
| EP | 0 465 710 A1 | 1/1992 |

OTHER PUBLICATIONS

ALBRECHT_Machine_Translation "Translation of German Application No. DE10344070"*

* cited by examiner

*Primary Examiner* — Thuan Do
*Assistant Examiner* — Magid Dimyan

(57) ABSTRACT

A signal converter device has a programmable logic circuit, wherein a number of binary input signals are being transmitted from the outside of the signal converter unit. The programmable logic circuit is programmed by a programming in such a way, as to detect binary output signals from a number of logic functions. The output signals are output by the signal converter device to the outside. The logic functions are designed in such a manner, that the output signals are determined exclusively by logic associations of the input signals. The output signals are at least partially transmitted to drives. Programming is in such a way, that for at least two drives, output signals to be emitted to the drives are determined uniformly.

8 Claims, 4 Drawing Sheets

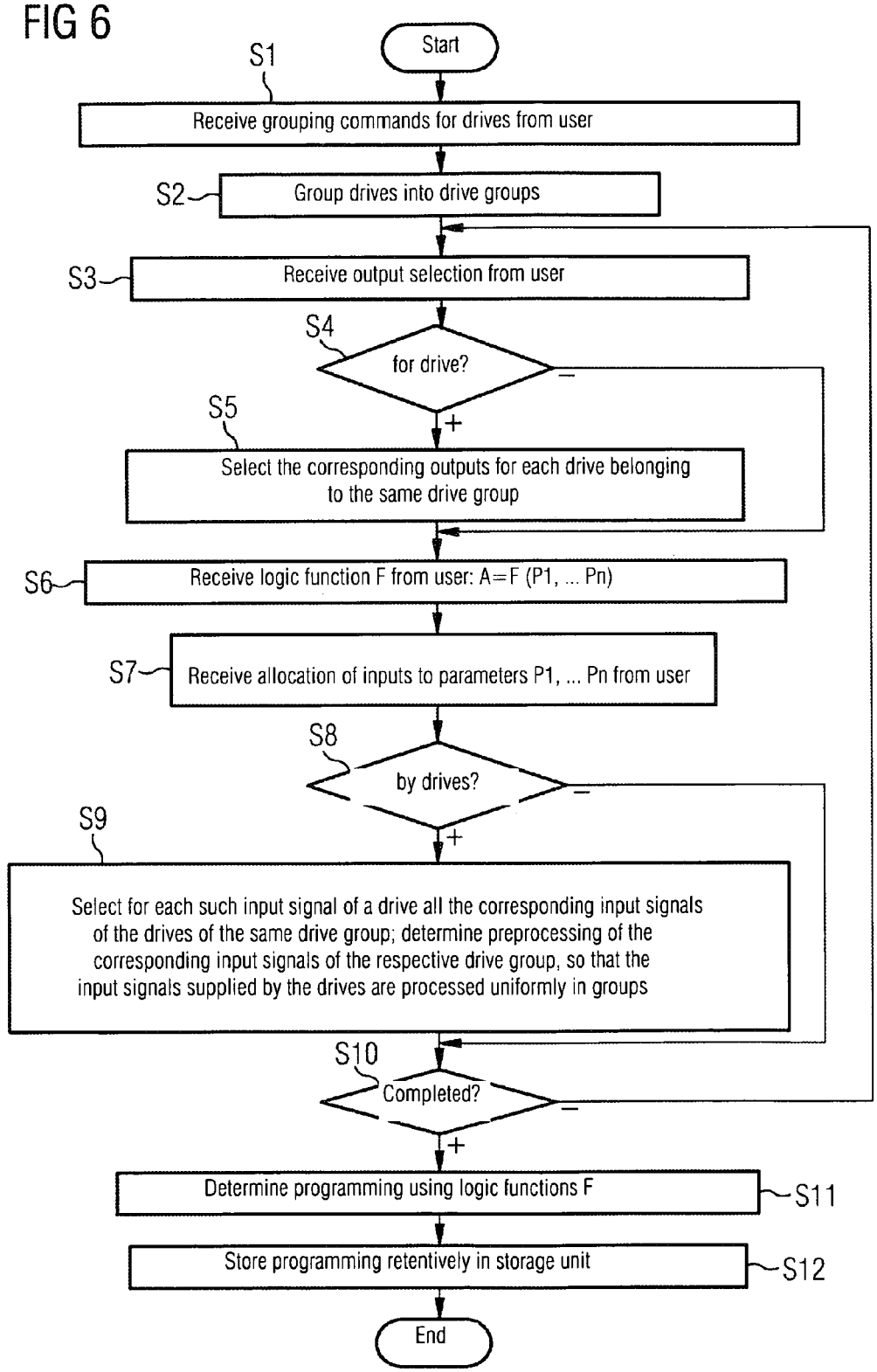

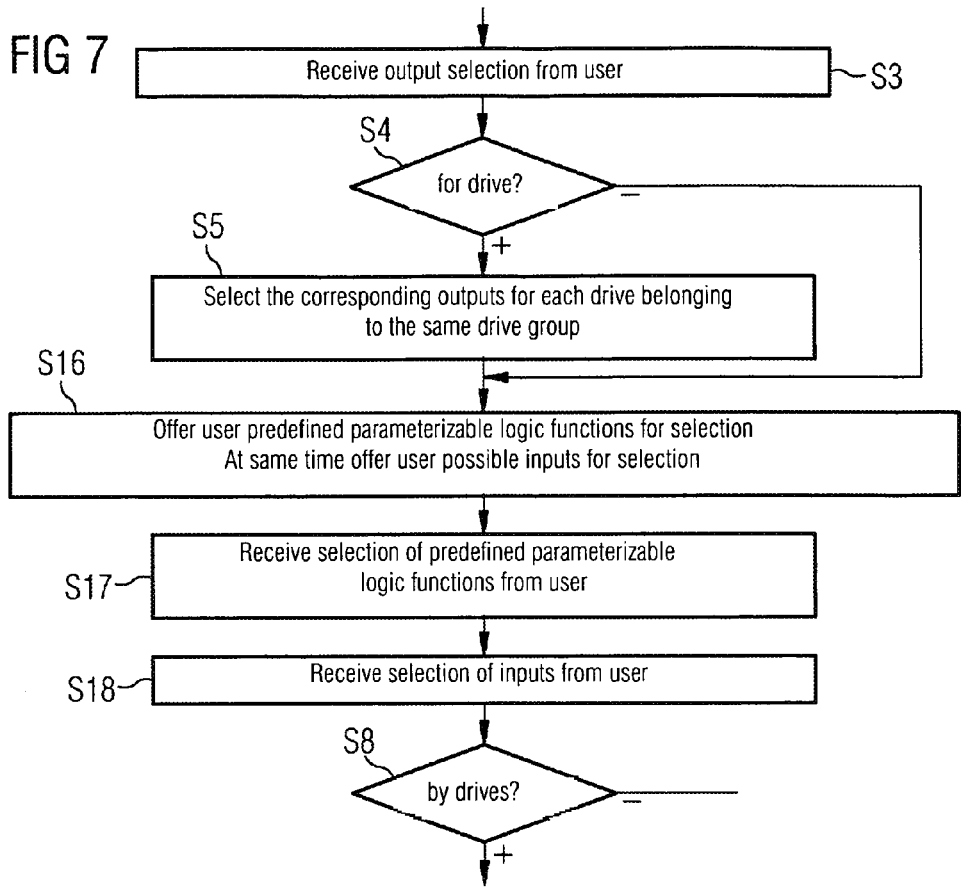
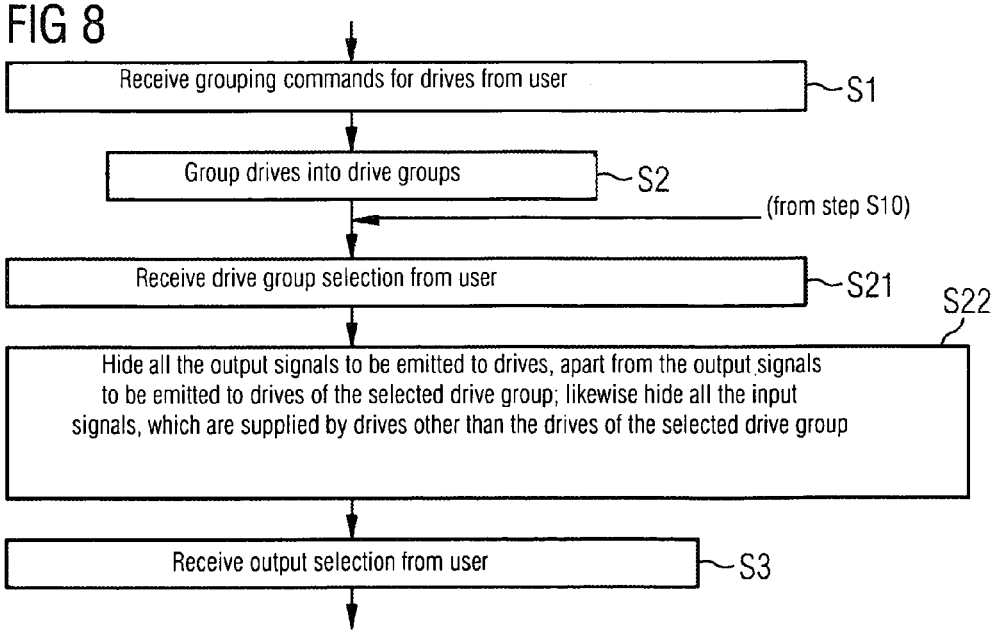

SIGNAL CONVERSION FACILITY AND METHOD FOR CREATING PROGRAMMING FOR A SIGNAL CONVERSION FACILITY

CROSS REFERENCE TO RELATED APPLICATIONS

This application is the US National Stage of International Application No. PCT/EP2007/058223 filed Aug. 8, 2007 and claims the benefit thereof. The International Application claims the benefits of German application No. 10 2006 037 975.6 DE filed Aug. 14, 2006, both of the applications are incorporated by reference herein in their entirety.

FIELD OF INVENTION

The present invention relates to the field of electrical multiple-axle drives.

BACKGROUND OF INVENTION

Electrical single-axle drives are often structured with multiple stages. They consist of a control facility, a motor control unit and an electric motor. In normal mode the control facility receives setpoint values from a higher-order controller in a clocked manner. It also receives actual values. The received setpoint and actual values can be position, speed or torque values. The control facility uses the setpoint values and actual values to determine setpoint current values and transmits these to the motor control unit. The motor control unit also receives an actual current value and uses the setpoint current value and the actual current value to determine activation signals for electronic circuit breakers, by way of which the electric motor is connected to an energy supply. The electronic circuit breakers are generally integrated in the motor control unit.

Instead of an individual electric motor, a group of electric motors can also be present in an electrical single-axle drive, if all the electric motors in the respective group are always activated in the same manner.

Electrical multiple-axle drives are structured in the same manner as electrical single-axle drives. However they have a number of electric motors and a number of motor control units, with each electric motor being activated individually by a control facility common to the electric motors. Each motor control unit is generally configured as a dedicated structural unit. However the motor control units can alternatively be combined to form a common structural unit—optionally also in conjunction with the control facility.

Axle drives can generally not only be operated in normal mode but also in safety mode. For example an axle drive can be switched to zero current, braked actively to a standstill and then switched to zero current, braked actively to a standstill and then kept actively at a standstill or operated at limited speed. Other states are also possible.

In order to be able to identify whether safety mode should be assumed and which safe state (see examples above) should be assumed in some instances, corresponding switching signals must be supplied to the control facility and/or the motor control units. In some instances feedback signals must also be output by the control facility and/or the motor control units.

It is known in the prior art that the corresponding switching signals can be supplied to each motor control unit by way of connections to be wired individually (e.g. screw terminals or cage clamp terminals). Feedback signals that have to be emitted in some instances are emitted in a similar manner. This type of connection is very flexible but it is time-consuming and error-prone. In particular the time outlay required to connect the required signal lines manually increases in a linear manner (or more steeply) with the number of drives. This is also the case when the same signal (e.g. an emergency stop signal) is to trigger the same safety response in a number of drives, which can be activated independently of one another in normal mode.

To reduce the wiring outlay it is known that the motor control unit can be connected to a safe bus (e.g. PROFIsafe) and the switching signals—optionally also the feedback signals—can be transmitted by way of the bus. However, this solution requires the deployment of a fail-safe controller, which in many instances is not possible and is also technically complex.

In the case of a component conductor connection the respective safety function per se must also be integrated in the motor control units. The motor control unit must therefore be able to identify and generate the required safety state based on the switching signals supplied to it.

It is already known that the motor control unit can be supplied with a prefabricated multipole interface, onto which a plug-type module can be plugged. In this embodiment the plug-type module is responsible for converting the switching signals supplied to the plug-type module to the corresponding control signals to trigger the respective safety function in the motor control unit. The output signals emitted by the plug-type module are determined based on logic functions, which incorporate both the input signals, supplied to the plug-type module and internally stored states.

However it is not possible to resolve the underlying problem of the prior art even with plug-type modules, since the wiring outlay remains the same. It is only displaced from the motor control units to the plug-type modules.

A control module for a number of controllable drive axles of a printing machine is known from DE 103 44 070 A1. The control module has a drive computation unit, which is suitable for controlling a number of drive axles as a function of predetermined activation signals. The control module also has a monitoring computation unit, which is suitable for monitoring and in some instances preventing the movement of the drive axles as a function of predetermined safety data. The monitoring computation unit appears to be an integral part of the control module. The input signals, which the monitoring computation unit uses to determine whether the drives have to be switched to a safe state, are supplied to the control module by way of a bus connection.

A device for monitoring safety for protection facilities is known from EP 0 465 710 A1, being structured in a module manner from a number of units, with the individual units being connected electrically to one another by plug-type contact means and being mounted mechanically side by side.

SUMMARY OF INVENTION

An object of the present invention is to create possibilities for reducing the wiring outlay without restricting the flexibility of single wire harnessing to a significant degree.

According to the invention the object is achieved by a signal conversion facility, a method for creating programming for a signal conversion facility and by a computer readable medium according to the independent claims.

The signal conversion facility has a programmable logic circuit, to which a number of binary input signals can be supplied from outside the signal conversion facility. The programmable logic circuit is programmed by programming so that it determines binary output signals based on a number of logic functions. The logic functions are configured so that the output signals are defined exclusively by logical linking of the input signals. The output signals can be emitted to the outside by the signal conversion facility. At least some of the emitted output signals can be emitted to drives. The programming is such that for at least two drives output signals to be emitted to said drives are determined uniformly. The signal conversion facility is configured as a dedicated module. It has a prefabricated drive interface and a further interface. The input and output signals to be exchanged with the drives are transmitted by way of the drive interface, with further input and output signals being transmitted by way of the further interface. The further interface has inputs and outputs, which are configured as single connections.

To create the programming, a user predetermines grouping commands for drives for a computer. The computer groups the drives into drive groups based on the grouping commands. The user also predetermines logic functions for the computer. The logic functions are defined so that binary output signals to be emitted by the signal conversion facility are defined exclusively by logical linking of binary input signals to be supplied to the signal conversion facility. The computer uses the predetermined logic functions and the grouping commands to determine programming for the programmable logic circuit of the signal conversion facility and stores it retentively in a storage unit. It determines the programming so that for every output signal emitted to one of the drives the signal conversion facility emits a corresponding output signal to every other drive of the same drive group.

It is also possible in particular for the switching signals themselves or signals defining the switching signals only to have to be supplied to the signal conversion facility once, regardless of whether they are required just once or a number of times. The particularly simple and flexible connection of the further input signals and the further output signals is also maintained.

It is possible for the drives for which it is determined to be assigned to each output signal separately. However a number of output signals are preferably assigned to each drive in a proprietary manner.

If the drives emit feedback signals, these feedback signals represent input signals from the point of view of the signal conversion facility. The logic functions are preferably configured so that corresponding input signals supplied by the drives whose output signals are determined uniformly are processed in the same manner.

As with the output signals a number of input signals are also assigned to each drive in a proprietary manner. The same applies for the creation method. This allows any feedback signals required to be preprocessed after being previously coordinated in the signal conversion facility.

In a preferred embodiment of the signal conversion facility the programmable logic circuit has a sub-circuit configured in a fail-safe manner, at least some of the input signals can be supplied to the sub-circuit, the sub-circuit links the input signals supplied to it logically in a fail-safe manner, at least some of the output signals are determined and emitted by the sub-circuit and the output signals emitted by the sub-circuit are emitted by the sub-circuit in a fail-safe manner. The same applies to the creation method.

It is possible for it to be predetermined which of the output signals are determined by the signal conversion facility in a fail-safe manner and/or which of the input signals are supplied to the signal conversion facility in a fail-safe manner. Alternatively it is possible for the user to predetermine for the computer, which of the output signals are determined by the signal conversion facility in a fail-safe manner and/or which of the input signals are supplied to it in a fail-safe manner.

The signal conversion facility is preferably configured as a plug-type module and can be connected to the control facility in a mechanically stable manner and also electrically in respect of the drive interface by plugging the plug-type module into a corresponding interface of a control facility for the drives. This allows simple, fast and correct connection of the signal conversion facility to the control facility.

The signal conversion facility can have a storage unit for storing the programming and a programming interface connected to the storage unit to supply programming to the storage unit. Alternatively or additionally it can have a receptacle for a retentive storage unit holding the programming.

The computer preferably offers the user parameterizable logic functions for selection and possible input signals as parameters for selection, in order to predetermine one of the logic functions respectively. The computer then determines the respective logic function based on the selection of one of the parameterizable logic functions and the selection of the possible input signals by the user. This procedure simplifies and accelerates the predetermination of the logic functions.

The computer preferably determines the programming so that for each drive the signal conversion facility emits the output signals determined for the respective drive as output signals determined in a proprietary manner for the respective drive and receives the input signals supplied by the respective drive as input signals supplied in a proprietary manner by the respective drive. This embodiment facilitates the definition of the interface between the signal conversion facility and the control facility.

The computer preferably determines the programming so that for each drive the signal conversion facility emits the output signals determined for the respective drive by way of outputs assigned in a proprietary manner to the respective drive and receives the input signals supplied by a determined one of the drives by way of inputs assigned in a proprietary manner to the respective drive. This facilitates the definition of the interface between the signal conversion facility and the control facility still further.

BRIEF DESCRIPTION OF THE DRAWINGS

Further advantages and details will emerge from the further claims and the description which follows of exemplary embodiments in conjunction with the drawings of basic diagrams, in which:
FIGS. 6 to 8 show flow diagrams and
  FIG. 9 shows a block diagram of a possible logic circuit.

DETAILED DESCRIPTION OF INVENTION

Figure 1:
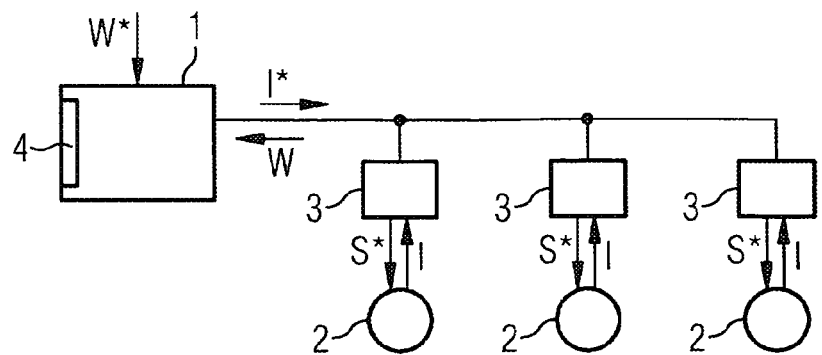
FIG. 1 shows a drive system.

According to FIG. 1 a multiple-axle drive has a common control facility 1 and a number of electric motors 2. A motor control unit 3 is assigned to each electric motor 2. The electric motors are also referred to as drives 2 below.

In normal mode the control facility 1 receives setpoint values W* from a higher-order control facility (e.g. a numerical controller) (not shown) for each electric motor 2 in a clocked manner. The setpoint values W* can be setpoint position, speed or torque values. It is possible for the type of the respective setpoint value W* to vary from electric motor 2 to electric motor 2.

Actual values W corresponding to the setpoint values W* are also supplied to the control facility 1. The control facility 1 uses the setpoint values W* and the corresponding actual values W for the electric motors 2 to determine a setpoint current value I* in a clocked manner for each electric motor 2 and transmits it to the motor control unit 3 assigned to the respective electric motor 2. The respective motor control unit 3 receives the setpoint current value I*. It uses the setpoint current value I* and a corresponding actual current value I of the respective electric motor 2 supplied to it to determine activation signals S* for electronic circuit breakers in a clocked manner. The electronic circuit breakers are used to connect the corresponding electric motor 2 to an electrical supply network, for example a three-phase alternating current voltage network, or an intermediate circuit of a voltage or current link converter. The electronic circuit breakers and the supply network are not shown in FIG. 1 for the sake of clarity.

The control facility 1 is configured so that it can operate the electric motors 2 both in normal mode and also in a safety mode. In safety mode the electric motors 2 are monitored to ensure that they comply with predetermined safety states. Examples of possible safety states are speed-limited operation of the electric motor 2, switching the electric motor 2 to zero current and active braking of the electric motor 2 to a standstill, followed by switching the electric motor 2 to zero current or actively keeping the electric motor 2 at a standstill.

The safety mode is triggered—in principle individually for each electric motor 2—by supplying corresponding switching signals to the control facility 1. The control facility 1 then activates the respective motor control unit 3 of the relevant electric motor 2 correspondingly. When the associated electric motor 2 has assumed safe mode, the control facility 1 can emit a corresponding feedback signal to the outside.

Both the switching signals and also the feedback signals are binary signals. To supply the switching signals to the control facility 1 and to emit the feedback signals the control facility 1 has a communication interface 4. The communication interface 4 is prefabricated. It can be configured for example—see FIG. 2—as a multipole connector jack. Alternatively it could be configured as a serial interface for example.

Figure 2:
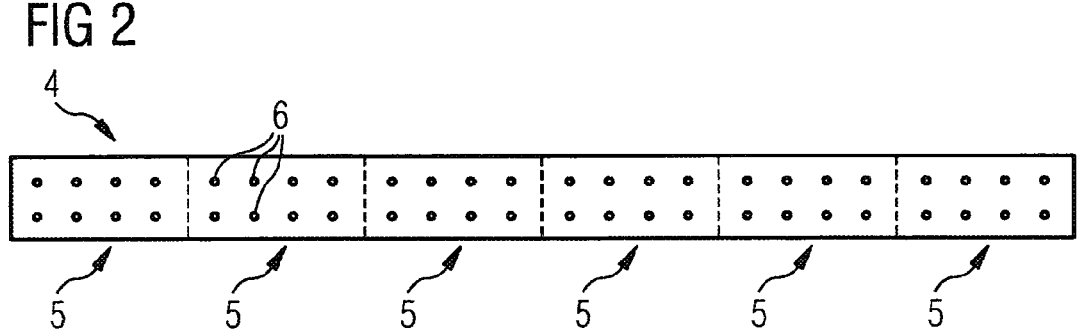
FIG. 2 shows a communication interface.

When it is embodied as a parallel interface according to FIG. 2 it is preferable for the communication interface 4 to have a number of contact groups 5. Each contact group 5 has a number of contacts 6. The switching signals for one of the electric motors 2 respectively are fed to the control facility 1 and the feedback signals supplied by said electric motor 2 are emitted by way of the contacts 6 of one of the contact groups 5 respectively. Either just one switching signal or just one feedback signal is generally transmitted per contact 6.

The contacts 6 generally correspond to one another across the contact groups. It is also generally predetermined which signal is transmitted by way of which contact 6.

Purely by way of example let it be assumed that six contact groups 5 are present, each with 8 contacts 6. It is then possible to transmit the following by way of two contacts 6 of a contact group 5 respectively:

one switching signal to transmit the request to switch the corresponding electric motor 2 to zero current, one switching signal to transmit a request to brake the corresponding electric motor 2 actively to a standstill and then switch it to zero current, one switching signal to transmit a request to operate the corresponding electric motor 2 at limited speed and one feedback signal indicating whether or not the respective safe state has been achieved.

Transmission of the signals by way of two contacts 6 respectively serves to achieve fail-safe signal transmission.

If the communication interface 4 is configured as a serial interface, groups of switching signals can be transmitted to the control facility 1 and groups of feedback signals can be emitted by the control facility 1 in an alternating manner by way of the communication interface 4. Each emitted signal can be assigned to a specific drive 2 and a specific signal in a proprietary manner—for example based on a corresponding address and type assignment or due to its sequence in the transmitted bit pattern.

Figure 3:
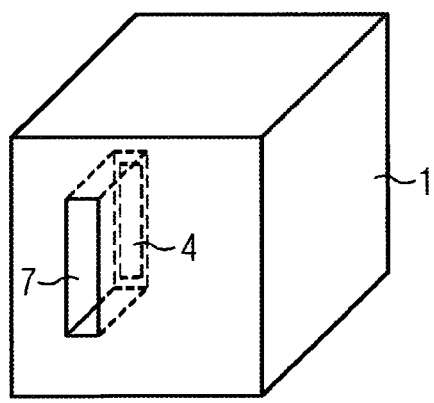
FIGS. 3 and 4 show partial views of a control facility.
Figure 4:
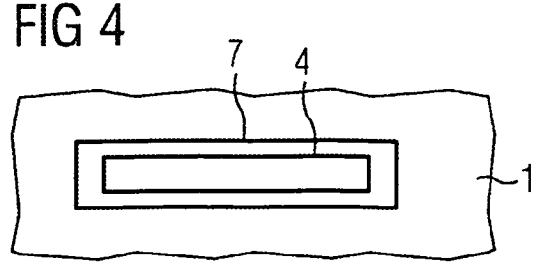

According to FIGS. 3 and 4 the communication interface 4 is arranged for example in the base of a raceway 7, into which a corresponding plug-type module 8 (see FIG. 5) can be inserted. The dimensions of the plug-type module 8 are tailored to the raceway 7. It has a drive interface 9, which corresponds 1:1 to and interacts with the communication interface 4. When the plug-type module 8 is plugged into the raceway 7, the plug-type module 8 is connected to the control facility 1 in a mechanically stable manner and also electrically in respect of the drive interface 9.

The arrangement of the plug-type module 8 in the raceway 7 is preferred but not absolutely mandatory. Connection of the plug-type module 8 to the control facility 1 and above all the mechanical stabilization of the plug-type module 8 could also be ensured in another manner.

Figure 5:
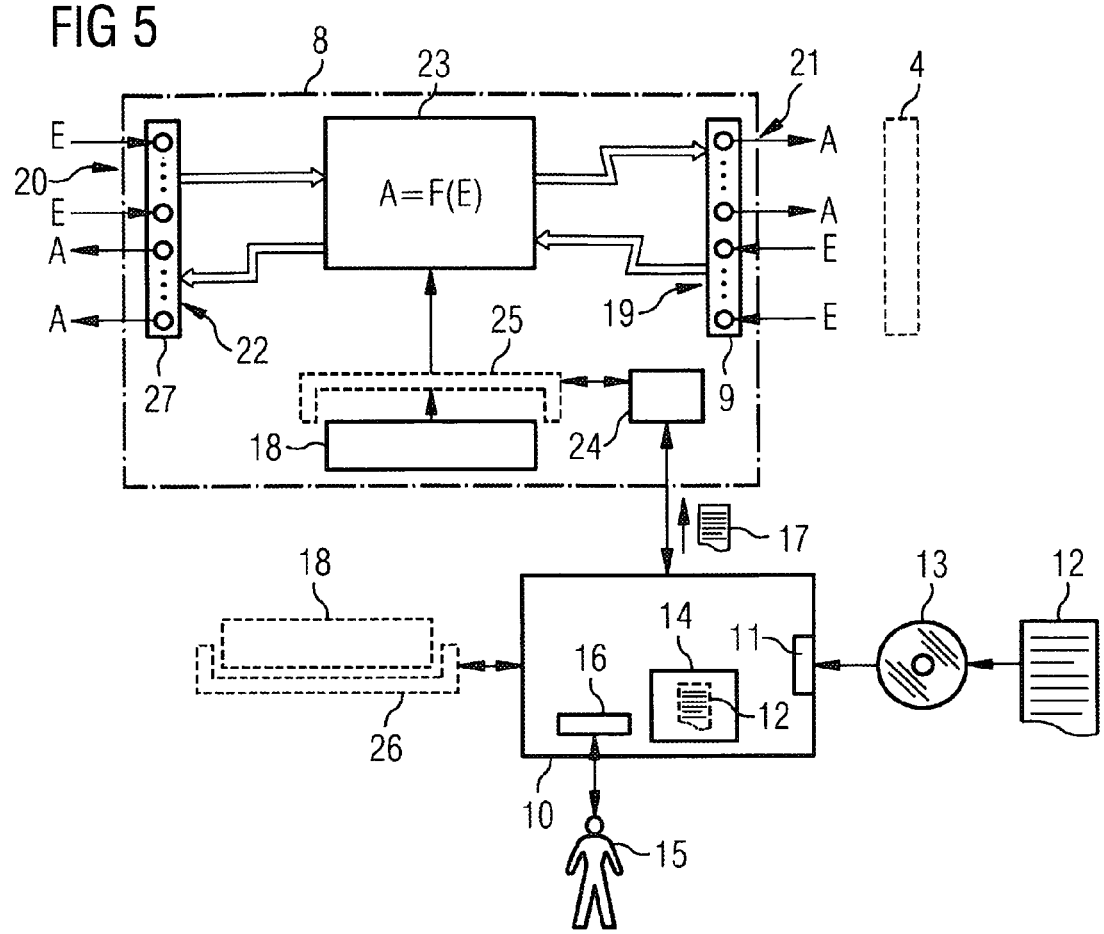
FIG. 5 shows a block diagram showing a signal conversion facility.

The plug-type module 8 in FIG. 5 represents a signal conversion facility. The embodiment and operation of the signal conversion facility 8 are the primary subject matter of the present invention.

The signal conversion facility 8 is programmable. Creation of the programming is also the subject matter of the present invention. The creation of the programming is examined in more detail first below.

According to FIG. 5 a computer program 12 is supplied to a computer 10 by way of a suitable interface 11 (for example a CD-ROM drive, a USB interface or a network connection). The computer program 12 can optionally be stored in machine-readable form on a—preferably portable—data medium 13 (for example a CD or USB memory stick). The computer program 12 is stored in a mass storage unit 14 of the computer 10. It contains machine code, which can be processed by the computer 10. When the computer program 12 is called up by a user 15 by way of a user interface 16, it is processed by the computer 10. The processing of the computer program 12 causes the computer 10 to execute a method for creating programming 17 for the signal conversion facility 8. The creation method is described in more detail below in conjunction with FIG. 6.

According to FIG. 6 in a step S1 the user 15 predetermines grouping commands for the drives 2 for the computer 10. In a step S2 the computer 10 groups the drives 2 into drive groups based on the grouping commands.

In a step S3 the user 15 predetermines a selection of an output signal A for the computer 10. The output signals can be fail-safe or not fail-safe. In the context of FIG. 6 each output signal A is a valid (numeral) output signal A, regardless of whether or not it is fail-safe.

In a step S4 the computer checks whether the output signal A selected in step S3 is determined for a drive 2. If so (and only then), in a step S5 the computer 10 selects the corresponding output signal A for each drive 2 belonging to the same drive group as the drive 2 determined in step S3.

In a step S6 the computer 10 receives a logic function F from the user 15.

The logic functions F can be predefined. They can also be defined by the user 15. It is important for the logic functions F to be dependent exclusively on parameters P1 ... Pn, to which binary input signals E can be allocated. In contrast there are no dependencies for markers, internal states or time periods. The function value of the logic functions F therefore depends exclusively on the parameters P1 ... Pn.

Either an input signal E is allocated to each of the parameters P1 ... Pn or it is defined as not in use. The computer 10 receives the corresponding allocation from the user 15 in a step S7. The input signals E can already be switching signals, which in principle only have to be forwarded to the respective drives 2. They can be fail-safe or not fail-safe. In the context of FIG. 6 each input signal E is a valid (numeral) input signal E, regardless of whether or not it is fail-safe.

Steps S8 and S9 are preferably present. In step S8 the computer 10 checks which of the input signals E are to be supplied to the signal conversion facility 8 by the drives 2. When such input signals E are determined (and only then), in a step S9 the computer 10 selects for each such input signal E of a drive 2 all the corresponding input signals E of the drives 2 of the same drive group and determines a preprocessing of the corresponding input signals E of the respective drive group. Preprocessing is defined so that the input signals E supplied by the drives 2 are processed uniformly in groups. For example corresponding input signals E can be AND-linked or OR-linked in groups.

In a step S10 the computer 10 checks whether predetermination of the logic functions F is completed. If predetermination is not completed, the computer 10 returns to step S3. Otherwise it moves on to step S11.

In step S11 the computer 10 uses the logic functions F to determine the programming 17. The computer 10 stores the determined programming retentively in a storage unit 18.

According to FIG. 5 the signal conversion facility 8 can have a number of inputs 19, 20. One binary signal E can be supplied respectively to the signal conversion facility 8 from outside by way of the inputs 19, 20. The signal conversion facility 8 can also have a number of outputs 21, 22. One binary output signal A can be emitted respectively to the outside by the signal conversion facility 8 by way of the outputs 21, 22.

The inputs 19, 20 and the outputs 21, 22 are connected to a programmable logic circuit 23, which is likewise part of the signal conversion facility 8. This logic circuit 23 is programmed by means of the programming 17. The input signals E mentioned in the context of FIG. 6 and the output signals A mentioned in the context of FIG. 6 are therefore supplied to the signal conversion facility 8 by way of the inputs 19, 20 or emitted from the signal conversion facility 8 by way of the outputs 21, 22.

The storage unit 18, in which the programming 17 is stored retentively, is a data medium. It can be identical to the mass storage unit 14. Alternatively however it can be a different storage unit 18.

The storage unit 18 can be part of the signal conversion facility 8. The storage unit 18 is then assigned to the signal conversion facility 8. The programmable logic circuit 23 is then programmed by the computer 10 according to the programming 17 stored in the storage unit 18. It is possible for example for the signal conversion facility 8 to have a programming interface 24 that can be accessed from outside and is connected to the storage unit 18. It is then possible for the computer 10 to supply the programming 17 to the storage unit 18 by way of the programming interface 24.

If programming is possible by way of the programming interface 24, the storage unit 18 can be permanently assigned to the signal conversion facility 8. Alternatively it is possible for the signal conversion facility 8 to have a receptacle 25 for the storage unit 18. It is then possible—if present—for programming to take place by way of the programming interface 24. Alternatively however it is possible to remove the storage unit 18 from the receptacle 25 and insert it into a corresponding receptacle 26 in the computer 10. The storage unit 18 can then be assigned alternatively in a temporary manner to the signal conversion facility 8 and the computer 10 so that it has to be configured as a retentive storage unit 18.

The receptacles 25, 26 can in principle be embodied in any manner. For example they can be configured as a slot for a corresponding storage IC. They can also be configured as receptacles 25, 26 for a small memory card or as a USB port.

Alternatively it is possible for the programming 17 to be stored retentively in the control facility 1. It is then possible for the programming interface 24 to be part of the drive interface 9. The programming 17 can then be written to the storage unit 18 for example when the control facility 1 is booted up.

It can be seen from the above explanations relating to FIG. 2 that the communication interface 4 of the control facility 1 assigns specific contact groups 5 to defined drives 2 in a proprietary manner. The drive interface 9 corresponds to the communication interface 4. Therefore a number of outputs 21 of the signal conversion facility 8 are assigned to each drive 2 in a proprietary manner. Likewise a number of inputs 19 are assigned to each drive 2 in a proprietary manner. The computer 10 determines the programming 17 for this reason so that for each drive 2 the signal conversion facility 8 emits the output signals A determined for the respective drive 2 by way of outputs 21, which are assigned to the respective drive 2 in a proprietary manner. It also determines the programming 17 so that the input signals E supplied by a determined one of the drives 2 are received by way of inputs 19, which are assigned to the respective drive 2 in a proprietary manner. The computer 10 also determines the programming 17 so that for each drive 2 the signal conversion facility 8 emits the output signals A determined for the respective drive 2 by way of predetermined outputs 21 and receives the input signals E supplied by a determined one of the drives 2 by way of predetermined inputs 19.

As already mentioned above, the drive interface 9 can be configured as a serial interface. It is then also possible for the computer 10 to determine the programming 17 so that for each drive 2 the signal conversion facility 8 emits the output signals A determined for the respective drive 2 as output signals A determined in a proprietary manner for the respective drive 2 and receives the input signals E supplied by the respective drive 2 as input signals E supplied in a proprietary manner by the respective drive 2.

For example all the signals can always be transmitted individually or in groups, so that the sequence of the individual bits determines their assignment to a defined drive 2 and their significance.

The output signals A, which are supplied to the control facility 1 by the signal conversion facility 8 (in other words the switching signals) are generally transmitted by the signal conversion facility 8 in a fail-safe manner. In the case of these output signals A it can therefore be predetermined that the computer 10 determines the programming 17 so that these output signals A are determined by the signal conversion facility 8 in a fail-safe manner.

According to FIG. 5 the signal conversion facility 8 has a further interface 27 however. Output signals A can also be emitted by way of the further interface 27. These output signals A are hereafter referred to as further output signals A to distinguish them verbally from the switching signals emitted to the control facility 1.

The further output signals A can likewise be emitted in a fail-safe manner. Alternatively however it is possible for the further output signals A not to be emitted in a fail-safe manner. It is also possible for the user 15 to predetermine for the computer 10 whether and optionally which of the further output signals A are determined by the signal conversion facility 8 in a fail-safe manner. Alternatively again it is also possible for it to be predetermined for a first set of the output signals A whether or not they are emitted in a fail-safe manner and for the user 15 to predetermine for the computer 10 for a second set of the output signals A whether or not they are emitted in a fail-safe manner.

As far as the output signals A, which are determined in a fail-safe manner, are concerned, determination must also be fail-safe. For this it is necessary for the input signals E, which are included in the logic functions F, which are used to determined the fail-safe output signals A, likewise to be fail-safe. This can be achieved for example by supplying the input signals E to the logic circuit 23 per se in an already fail-safe manner, in other words dual channel at least. Alternatively it is also possible to combine two (or more) single-channel input signals E within the signal conversion facility 8 by corresponding logical linking to form a fail-safe input signal E.

As with the fail-safe emitting of the output signals A it can also be predetermined for the input signals E which of the input signals E are supplied to the signal conversion facility 8 in a fail-safe manner. Alternatively the user 15 can predetermine for the computer 10—as for the output signals A—whether and optionally which of the input signals E are supplied to the signal conversion facility 8 in a fail-safe manner.

It is possible in the context of implementing the steps S3, S6 and S7 for the user 15 to input in principle any Boolean function 16 as a logic function F for the computer 10 by way of a keyboard or another input facility of the user interface 16. For example the user 15 could input the following by way of the keyboard "A7=E4 AND E7 OR E8 NOT E3".

However it is much easier for the computer 10 to proceed as follows to implement steps S3, S6 and S7 according to FIG. 7:

According to FIG. 7 steps S6 and S7 are replaced by steps S16 to S18.

In step S16 the computer 10 offers the user 15 predefined parameterizable logic functions for selection. At the same time the computer 10 offers the user 15 possible input signals E for selection. The input signals E can then be restricted for each predefined logic function. For example for output signals A, which are to be emitted to the control facility 1, only input signals E, which are input by way of the inputs 20, can be permitted.

In step S17 the computer 10 receives the selection of the respective logic function (selection=one is determined). In step S18 the computer 10 receives from the user 15 the selection (selection=at least one is determined) of input signals E.

The procedure in FIG. 7 can therefore be embodied in an efficient manner in particular, because output signals A, which are determined for the drives 2, are generally determined exclusively by input signals E, which are input by way of the further inputs 20. Conversely output signals A, which are emitted by way of the further outputs 22, are generally determined exclusively—or at least predominantly—by feedback signals, which are supplied to the signal conversion facility 8 by way of the drive-related inputs 19. It is therefore possible for example to display a block on a monitor of the user interface 16, showing the corresponding predefined, parameterizable logic function F and the output signal A and then simply to enquire on an individual basis what the associated input signals E should be. The remaining input possibilities can then be reduced step by step with each input.

There is often no mutual influencing of the drive groups. It is then possible according to FIG. 8 to proceed as follows rather than using the procedure in FIGS. 6 and 7:

According to FIG. 8 steps S21 and S22 are inserted between steps S2 and S3. In step S21 the computer 10 receives a drive group selection from the user 15. In step S22 the computer 10 hides all the output signals A to be emitted to drives 2, apart from the output signals A to be emitted to drives 2 of the selected drive group. Likewise in step S22 it hides all the input signals E, which are supplied by drives 2 other than the drives 2 of the selected drive group.

The other embodiments for the procedure in FIG. 6 still remain valid. The procedure in FIG. 8 can also be combined with the procedure in FIG. 7.

As already mentioned above, the storage unit 18 can be assigned at least temporarily to the signal conversion facility 8. Similarly the programming 17 is stored—optionally retentively—on the storage unit 18. The programming 17 can therefore be used to program the programmable logic circuit 23 (see FIG. 5).

The logic circuit 23 can be configured as a standard microprocessor or similar. The programming 17 is then a standard computer program, which is processed sequentially by the logic circuit 23. Alternatively however it is possible for the logic circuit 23 to be programmed by circuit engineering. The internal switching of the logic circuit 23 is then set by the programming 17. If the logic circuit 23 is configured so that it can be programmed by circuit engineering, switching is therefore static and operates in a parallel manner for all input signals E and output signals A. Examples of such logic circuits are FPGAs (field programmable gate arrays), PLDs (programmable logic devices), etc.

Irrespective of the specific embodiment of the logic circuit 23 however the programming 17 causes the signal conversion facility 8 to be embodied according to the programming 17 described above and an operating method to be executed, which result from the programming 17 described in detail above. Therefore only the structure of the signal conversion facility 8 going beyond this is examined in more detail below.

As already mentioned above, the signal conversion facility 8 has a drive interface 9 and a further interface 27. The drive interface 9 is prefabricated.

According to the embodiment of the communication interface 4 (see FIG. 2), the drive interface 9 can be configured as a parallel interface. Each transmitted input signal E and each transmitted output signal A is then assigned a dedicated connection 19, 21 in a proprietary manner.

Alternatively the drive interface 9 can be configured as a serial interface.

Regardless of the specific embodiment of the drive interface 9, the output signals A to be emitted to the drives 2 and the input signals E supplied by the drives 2 are transmitted by way of the drive interface 9. Further input signals E and further output signals A are transmitted by way of the further interface 27.

The further inputs 20 and outputs 22 can likewise be prefabricated—in groups or all together. However the further inputs 20 and outputs 22 are preferably configured as single connections, for example as screw terminals or cage clamp terminals. It is also possible here for the specification as input 20 or output 22 to be programmable in particular in respect of the further inputs and outputs 20, 22.

Figure 9:
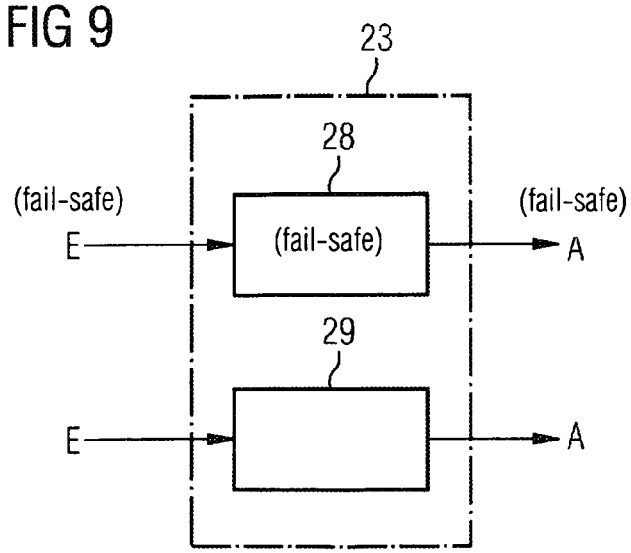

It is possible for the logic circuit 23 as a whole to be configured in a fail-safe manner. This embodiment should be preferred. In particular if it is already known which output signals A have to be determined in a fail-safe manner and which not, it may be possible however to divide the logic circuit 23 into a fail-safe sub-circuit 28 and a non-fail-safe sub-circuit 29. At least some of the input signals E can then be supplied to the sub-circuit 28 configured in a fail-safe manner—see FIG. 9. The fail-safe sub-circuit 28 links the input signals E supplied to it logically in a fail-safe manner. In this way it determines some of the output signals A, and in a fail-safe manner. It emits the output signals A it determines, likewise in a fail-safe manner.

The non-fail-safe sub-circuit 29 can process fail-safe input signals E and non-fail-safe input signals E. The processing operations it undertakes are not fail-safe. The output signals A it emits are likewise not fail-safe.

The present invention allows the outlay for the safe operation of a multiple-axle drive to be reduced, often considerably. In particular the number of further inputs and outputs 20, 22 is independent of the number of electric motors 2. Also the user 15 does not have to worry about the wiring from the signal conversion facility 8 to the drives 2. Incorrect wiring in particular becomes much less likely. In particular if the input signals E supplied to the signal conversion facility 8 already correspond both to the switching signals and also the feedback signals, it is only necessary for the logic circuit 23 to undertake simple signal division (in the case of the switching signals) and/or simple signal combining (AND or OR linking) of the feedback signals.

The invention claimed is:

1. A signal conversion facility, comprising:
   a programmable logic circuit to which a plurality of binary input signals are supplied from outside the signal conversion facility,
   wherein the programmable logic circuit is programmed so that binary output signals based on a plurality of logic functions are determined, the output signals being emitted to the outside by the signal conversion facility,
   wherein the logic functions are configured so that the output signals are defined exclusively by logical linking of the input signals,
   wherein some of the emitted output signals are emitted to drives,
   wherein, for at least two drives, output signals to be emitted to the two drives are determined jointly,
   wherein the signal conversion facility is configured as a separate module,
   wherein the signal conversion facility has a first drive interface which is connected to a control facility for the drives and a second interface,
   wherein the output signals emitted to the drives and the input signals supplied by the drives are transmitted by way of the first drive interface, and
   wherein further input signals and output signals are transmitted by way of the second interface and the second interface has inputs and outputs, which are configured as single connections.

2. The signal conversion facility as claimed in claim 1, wherein a plurality of output signals are assigned to each drive.

3. The signal conversion facility as claimed in claim 1, wherein at least some of the input signals are supplied by the drives and the logic functions are configured such that corresponding input signals supplied by the drives, whose output signals are determined jointly, are processed in the same manner.

4. The signal conversion facility as claimed in claim 3, wherein a plurality of input signals are assigned to each drive.

5. The signal conversion facility as claimed in claim 1,
   wherein the programmable logic circuit has a sub-circuit configured in a fail-safe manner,
   wherein at least some of the input signals are supplied to the sub-circuit,
   wherein the sub-circuit links the input signals logically in a fail-safe manner,
   wherein at least some of the output signals are determined and emitted by the sub-circuit, and
   wherein the output signals, emitted by the sub-circuit, are emitted by the sub-circuit in a fail-safe manner.

6. The signal conversion facility as claimed in claim 1, wherein the separate module is configured as a plug-type module and the plug-type module is connected to the control facility in a mechanically stable manner and also electrically in respect of the drive interface by plugging the plug-type module into a corresponding interface of a control facility for the drives.

7. The signal conversion facility as claimed in claim 1, further comprising:
   a storage unit for storing a computer program and a programming interface connected to the storage unit.

8. The signal conversion facility as claimed in claim 1, further comprising:
   a receptacle for a retentive storage unit holding the computer program.

* * * * *